Sept. 8, 1925.
M. L. AKERS
1,553,124
ROTARY MOTOR
Filed Oct. 23, 1923
6 Sheets-Sheet 4
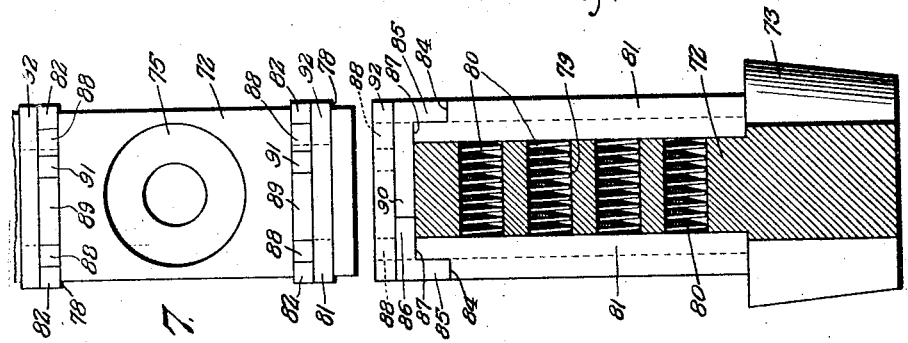
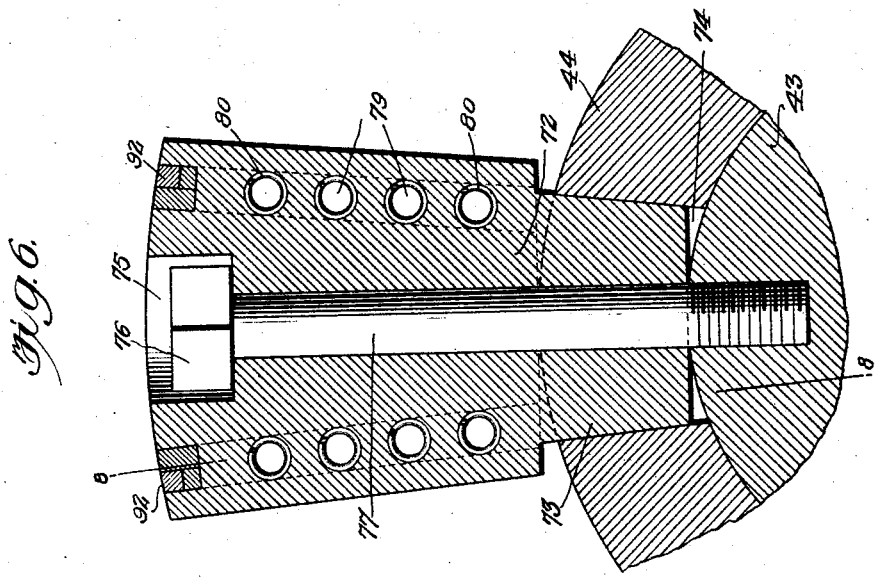
Inventor
Matthew L. Akers,
By Wilkinson & Ginsta
Attorneys

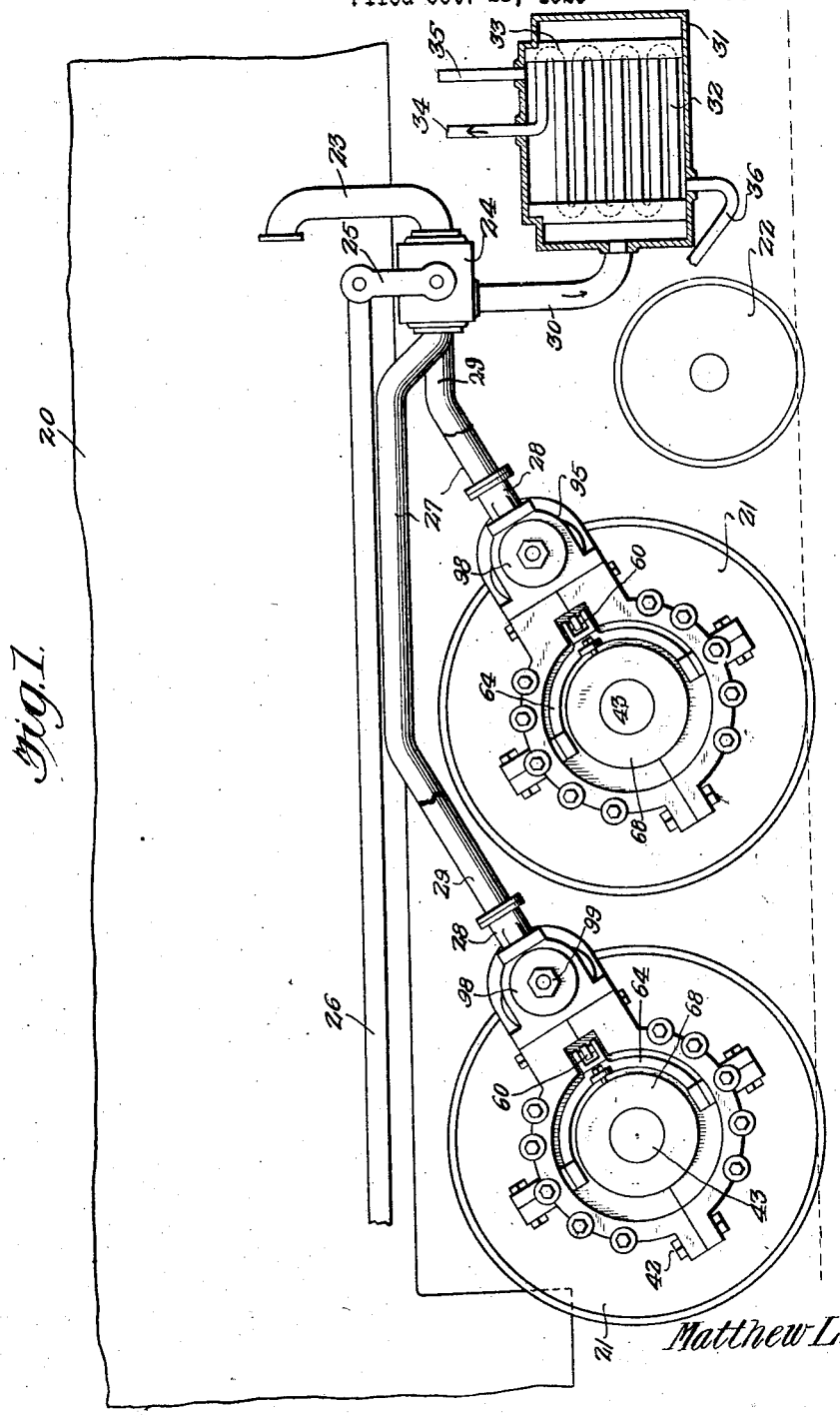

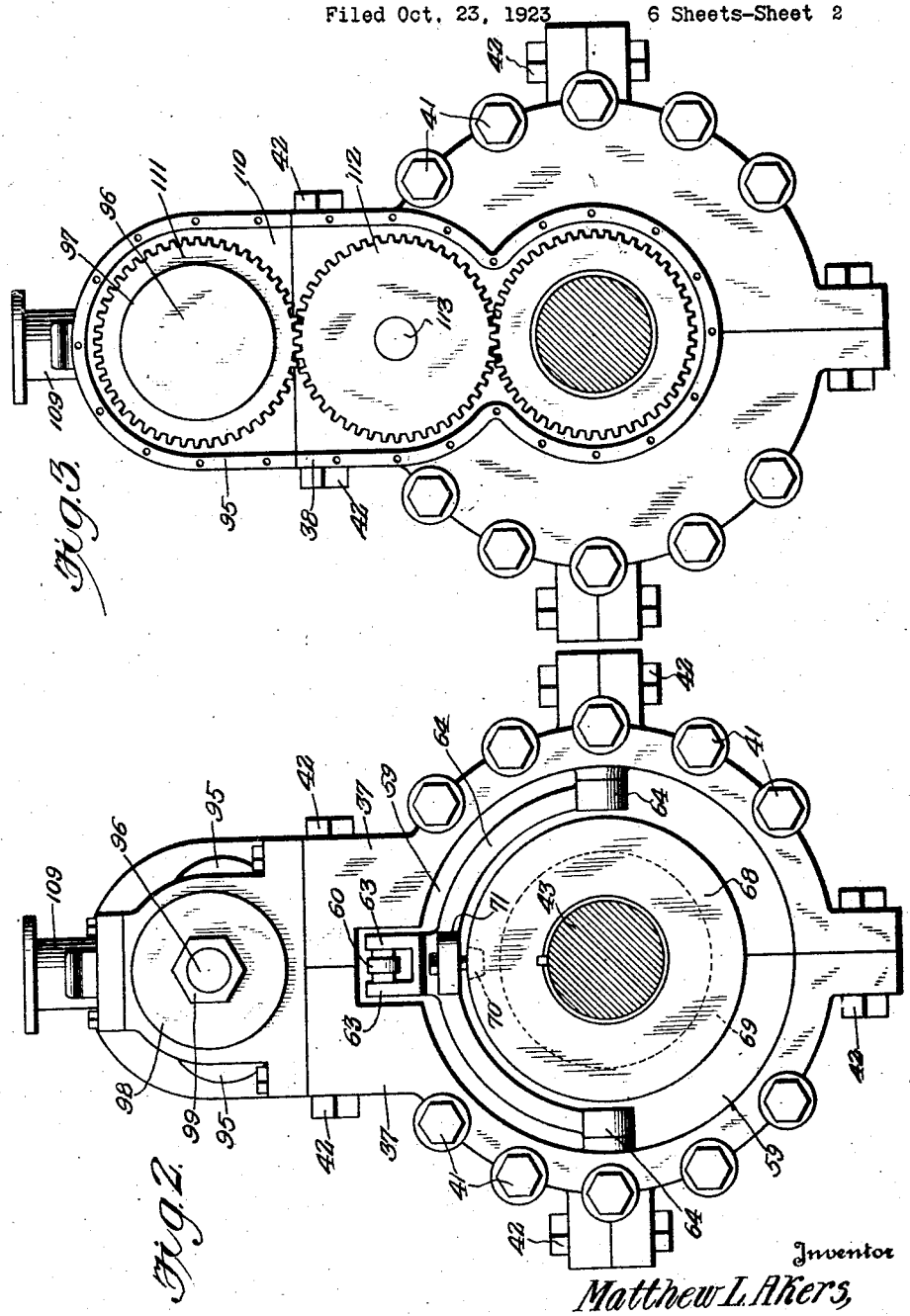

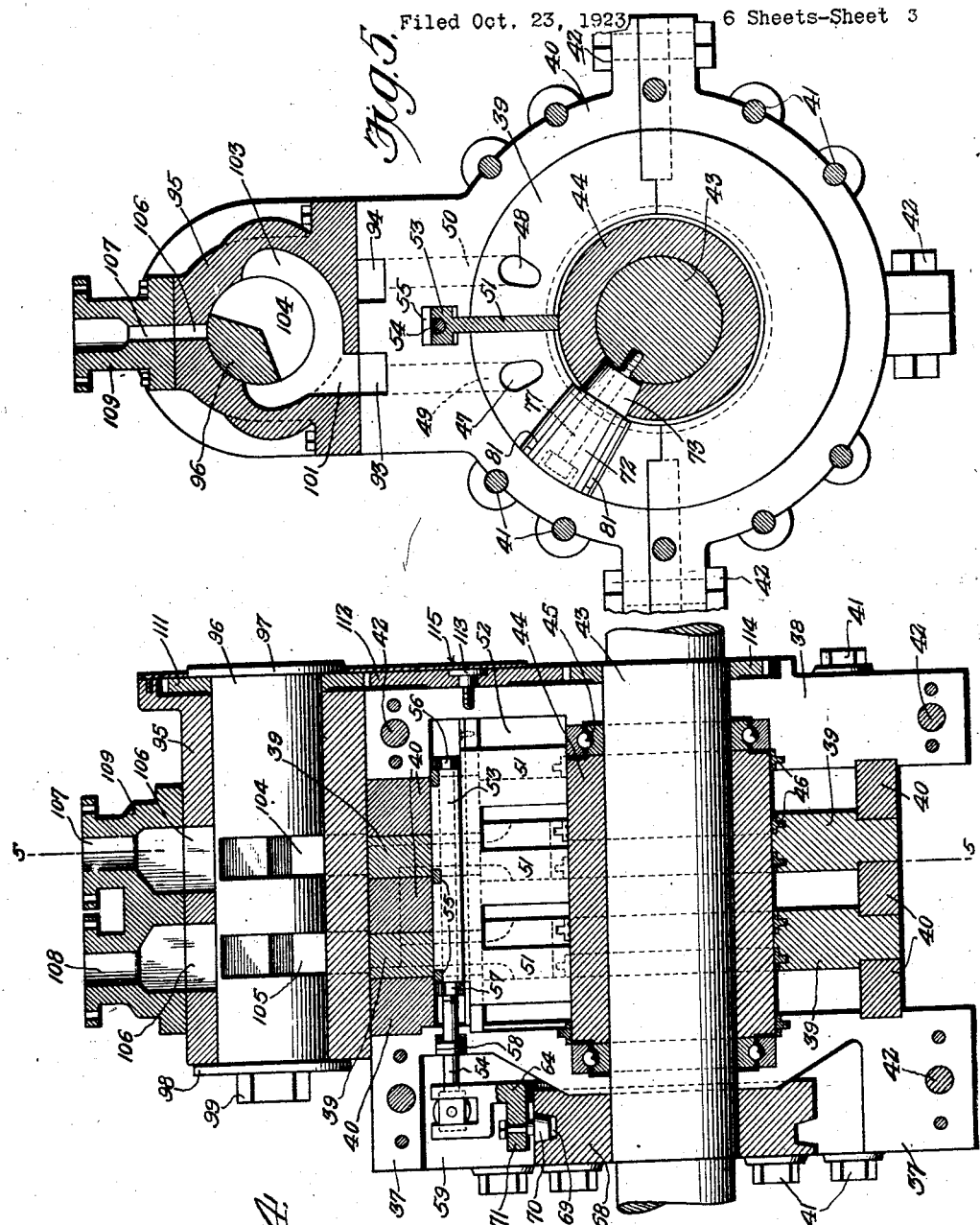

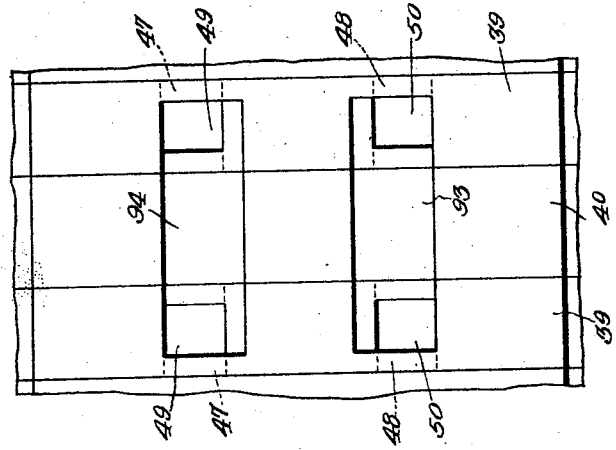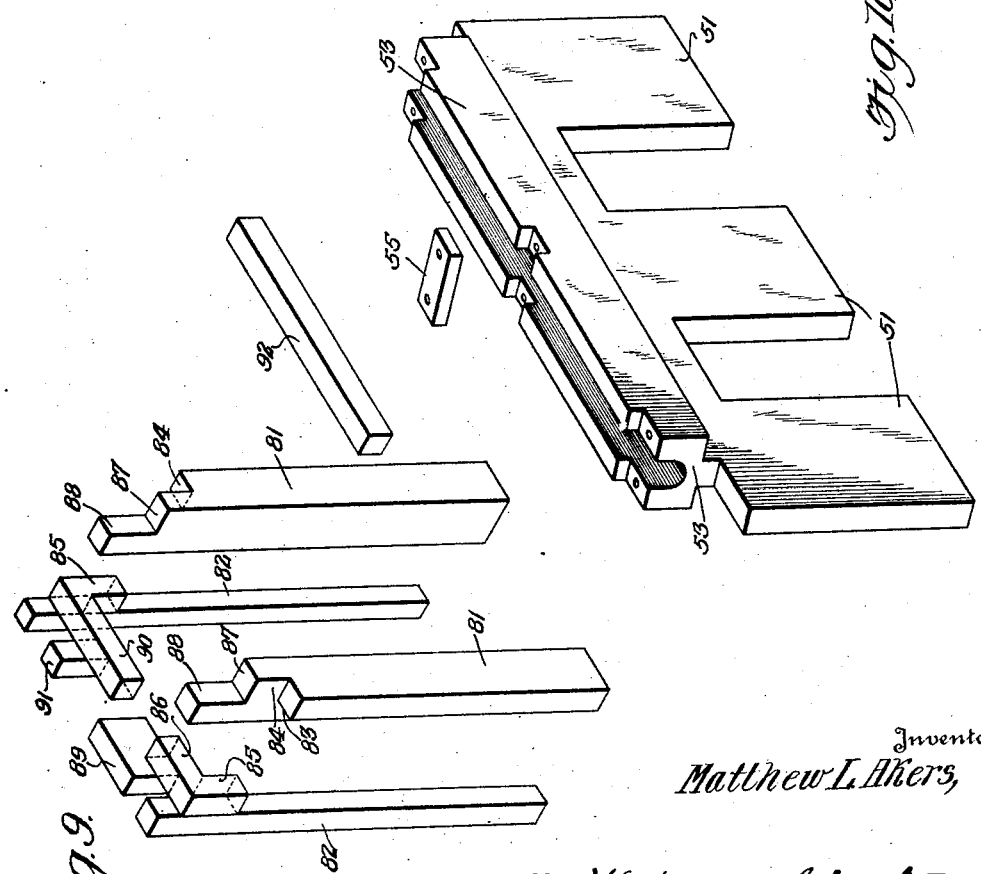

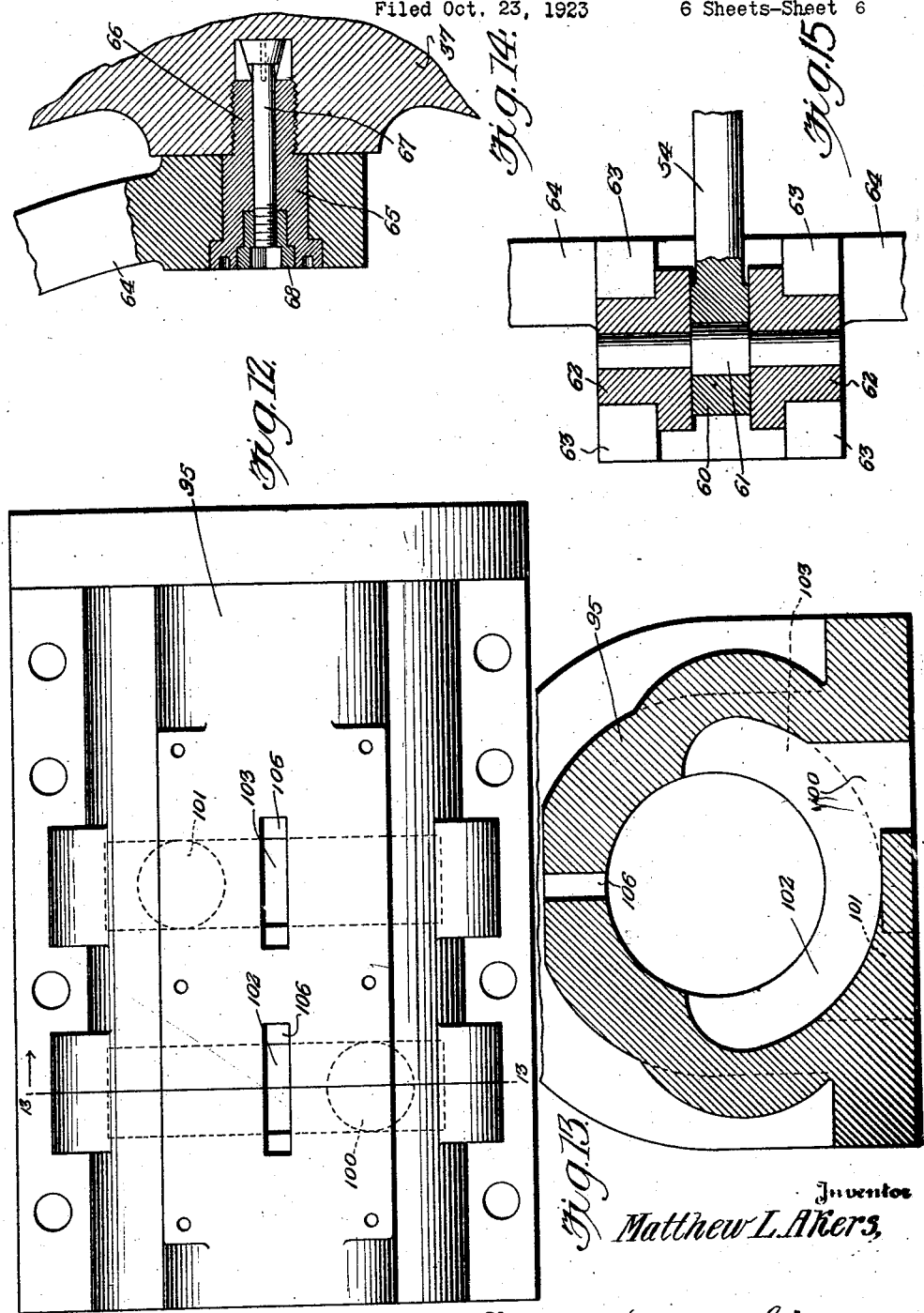

Patented Sept. 8, 1925.

1,553,124

UNITED STATES PATENT OFFICE.

MATTHEW L. AKERS, OF LOUISVILLE, KENTUCKY.

ROTARY MOTOR.

Application filed October 23, 1923. Serial No. 670,340.

*To all whom it may concern:*

Be it known that I, MATTHEW L. AKERS, a citizen of the United States, residing at Louisville, in the county of Jefferson and State of Kentucky, have invented certain new and useful Improvements in Rotary Motors; and I do hereby declare the following to be a full, clear, and exact description of the invention, such as will enable others skilled in the art to which it appertains to make and use the same.

The present invention relates to rotary motors, and particularly to a rotary engine for use with an elastic fluid such as steam.

An object of this invention is to provide a rotary engine for use with any kind of fluid and which is so constructed that it may be directly applied to a shaft or part to be driven and thus obtain a direct connection without loss of power and which, when applied to a locomotive eliminates the intermediate pistons, connecting rods, cross heads and all other power absorbing parts which reduce the effective horse power of the engine at the point of delivery of such power.

An object is to provide a rotary steam engine of this type which comprises an assemblage of parts which may be economically produced and which may be readily assembled in such manner as to provide substantial interfitting of the parts, and parts which in themselves may be relatively strong and capable of withstanding the various stresses incident to internal pressure and which may also be free for the proper expansion and contraction under the varying temperature conditions under which engines of this character are operated.

Another object is to provide a rotary steam engine embodying the above characteristics and which is of compact construction and capable of mounting in a limited space, such as upon locomotives and the like for the propulsion of the drivers thereof, and which is constructed for taking off the exhaust steam or other expansible fluid for utilizing the same in the preheating of the feed water.

A further object of the invention is to provide a rotary steam engine with an improved casing construction for housing the operative parts of the device including the valve and valve gearing and also the abutment and its operating cams and levers so that the device may be conveniently operated directly upon or adjacent to the drive shaft of a vehicle or the like for direct connection or gearing with the parts to be operated, and which affords a substantial protection to the operating parts of the motor.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of the lower portion of a locomotive having two rotary steam engines constructed according to this invention applied thereto, the view showing in section the exhaust drum and feed water heater located in substantially the same relative position as are the cylinders of the reciprocating steam engine of the present day type.

Figure 2 is an enlarged end elevation of the rotary engine showing the abutment operating mechanism.

Figure 3 is an opposite end elevation with the gear cover removed.

Figure 4 is a vertical longitudinal section taken through the rotary steam engine substantially centrally the vertical direction being with respect to the illustrations in Figures 2 and 3.

Figure 5 is a transverse section taken intermediately through the motor on the line 5—5 of Figure 4.

Figure 6 is a detail enlarged sectional view taken substantially centrally through one of the blades of the piston.

Figure 7 is a top plan view of the same.

Figure 8 is a longitudinal section taken through one edge portion of the blade substantially on the line 8—8 of Figure 6.

Figure 9 is a detail perspective view of the blade packing the parts being separated and in their relative positions for assembling.

Figure 10 is a detail perspective view enlarged, of the baffle plate.

Figure 11 is a fragmentary top plan view of the assembled port and spacer rings.

Figure 12 is a top plan view of the valve casing with the fluid supply casting removed.

Figure 13 is a transverse section taken through the same on the line 13—13 of Figure 12 and showing in dotted lines the arrangement of the opposite port.

Figure 14 is a fragmentary enlarged sectional view through one of the side bearings for the baffle rocker arm, and Figure 15 is a fragmentary sectional view taken through the upper end of the rocker arm, showing its connection to the baffle rod.

Referring to the drawings, first to Figure 1, 20 designates the body portion of a locomotive of any approved type which is provided with drivers 21 and a forward truck wheel 22, the illustration being somewhat diagrammatic for the purpose of illustrating one means of application of this rotary engine.

A steam supply pipe 23 leads into a valve casing 24 the valve of which is controlled by an arm 25 adapted to be rocked by a connecting rod 26 which may extend rearwardly as shown to any suitable point for operation. From the valve casing 24 any number of steam supply pipes 27 may lead, the supply pipes being connected in any suitable manner to the couplings 28 of rotary engines in desired number, one for each driver 21 as shown in the present illustration.

The exhaust steam from the engine returns through pipes 29 to the valve casing 24 and is directed through a pipe 30 into a drum 31, the exhaust steam passing through a coil 32 which is arranged intermediately in the drum 31 between a pair of baffles or partitions 33 which divide the drum 31 into the opposite end and in intermediate compartments. From the coil the steam is carried off through a pipe 34 to the stack of the locomotive or other suitable point of discharge as may be desired. Feed water is admitted through a pipe 35 to the intermediate compartment of the drum 31 and after passing about the coil 32 is carried off through a pipe 36 to the boiler or the like. It is of course understood that this specific application of the rotary steam engine is merely one of any number of applications which may be made, and the rotary engines may be used either singly or in multiple and may be connected directly to the drivers 21 as shown in Figure 1, or in any other manner found practical.

The rotary engine comprises a casing which is made up of opposite end sections or heads 37 and 38. The section 37 may be termed as the baffle end of the casing or housing, and the section 38 may be termed the gear end of the casing or housing. Clamped between the ends 37 and 38 of the housing are a plurality of housing sections in the form of port rings 39 and spacer rings 40 which are alternately assembled to provide the desired number of ports and circumferential compartments within the engine housing, and all of which are bound or clamped together by a circular row of clamping bolts 41 arranged lengthwise of the casing and substantially at the periphery thereof.

As shown to advantage in Figure 2 each section of the housing is preferably made in two semicircular parts clamped together by bolts 42 at their top and bottom portions. A shaft 43 extends axially through the housing and carries a sleeve 44 which is shrunk or otherwise permanently attached to the shaft 43 and which is supported at opposite ends upon bearings 45 carried in the end sections 37 and 38 of the housing. The port rings 39 have central openings of a size adapted to snugly receive the sleeve 44 therethrough, and packing rings 46 are placed within the port rings 39 and near the opposite faces of the latter for sealing the sleeve 44 through the rings. These packing rings 46 are also disposed in the end sections 37 and 38 near their inner faces so as to further seal the interior of the housing.

Each port ring 39 is provided in its upper portion with spaced apart ports 47 and 48 which extend from side to side through the ring 39 and which, intermediately opposite faces of the ring 39, and which open through the top edge of the ring as at 49 and 50 respectively. These ports 47 and 48 are disposed at opposite sides of a vertically disposed abutment 51 which intersects the port rings 39 and which is adapted to slide lengthwise through the port rings. As shown in Figure 5 the abutment 51 fits snugly in a slot formed radially in the adjacent port ring 39, and each port ring is similarly constructed.

As shown in Figure 4 an abutment 51 is vertically slotted at spaced intervals to provide three separate sections corresponding to the three annular chambers which are formed in the housing as shown. The abutment 51 may be slid in one direction, to the left as shown, for more or less interrupting the annular passages, and may be slid in an opposite direction, to the right as shown, to open these passages. The abutment 51 at its right end is adapted to move into a slot 52 of suitable width and depth to receive the abutment 51 and permit its complete opening of the annular chambers. The abutment 51 is provided with a laterally enlarged head 53 which extends for a considerable distance throughout the length of the abutment, and which is recessed in its upper face to receive a connecting rod 54 held in a head by a cap strip 55 or the like. This rod 54 is threaded on its inner end, or the end adjacent to the housing section 38, to receive a clamping nut 56. The intermediate portion of the rod 54 is also threaded to receive a second clamping nut 57, which is adapted to bind against the forward end of the head 53, the rod 54 projecting forwardly through the housing section 37 and projecting through a stuffing box 58. The section 37 is provided in its outer side with a recess 59 into which the rod 54 extends. As shown in detail in Figure 15 the rod 54 is provided on its outer end with an eye 60 in which is placed a wrist pin 61 which is shouldered and bears at its shoulders against bushings 62 mounted in vertical guides 63 forming the upstanding arms of a pair of forks carried upon the intermediate upper portion of a fork arm 64 which straddles the shaft 43.

Referring particularly to Figure 14, each lower end of the fork arm 64 is pivoted upon a rocker arm bushing 65 which is flanged or headed into the adjacent end of the rocker arm 64 and which has a threaded reduced extremity 66 secured in the end section 37 of the housing within the recess 59. A bushing 65 is held within the recess 59 by an expansion bolt 67, the nut 68 of which is countersunk in the head of the bushing 65. The rocker arm 64 is thus permitted and limited swinging movement in the general longitudinal direction axially of the engine for moving the abutment connecting rod 54 back and forth in a longitudinal direction.

The shaft 43 carries a cam 68 within the recess 59 of the housing section 37 and which has a peripheral cam groove 69 receiving a roller 70 therein, which roller is mounted upon an arm 71 which overhangs the cam 68 as shown in Figure 4. The cam slot or groove 69 is given the desired tortuous path to move the rocker arm at the desired interval and in the desired direction, and to the desired extent during the cycle of operations of the engine.

The sleeve 44 of the shaft 43 is provided with any desired number of blades, one for each annular chamber or the compartment of the engine. As shown in Figures 5 to 9 inclusive, each blade comprises an elongated block or body portion 72 which is provided with a shank 73 at its inner end arranged to fit in a recess 74 formed radially in the sleeve 44.

The outer end of the block 72 has a recess 75 to receive the head 76 of a bolt 77 which extends axially through the block 72 and is threaded into the shaft 43. The block 72 is of sufficient width to fit with the desired degree of tightness between the opposite walls of its annular chamber and is provided at opposite ends and in opposite sides with longitudinal recesses or grooves 78 which also extend across the outer or peripheral edge of the block 72. The outer edge of the block 72 is curved to conform to the inner wall of the spacing ring 39. The block 72 is also provided at opposite ends, with rows of openings 79 which register with the grooves 78 and into which are fitted expanding springs 80. The grooves 78 are arranged to carry packing for the blade and the springs 80 are adapted to expand and hold the packing against the inner opposite walls of the steam chamber.

As shown particularly in Figure 9, the packing for each groove 78 is in the form of pairs of bars or strips 81 and 82 arranged in the opposite sides of the block 72. The bars 81 are of right angle construction and provide each a recess 83 in its outer side and at one edge into which the companion bar 82 is adapted to seat. The outer side of the bar 81, at the top thereof, is also provided with a recess 84 to receive the vertical portion 85 of an angle block which is carried upon the upper end of the bar 82, the horizontal portion 86 of the angle block extending across a recess 87 at the top of the bar 81 for interlocking the bars 81 and 82 against separation. The inner side of the bar 81 is of the full width of the recess 78 and receives the adjacent ends of the springs 80 thereagainst for urging the bars 81 and 82 outwardly against the adjacent chamber wall.

The inner flat portion of the bar 81 is provided at its upper end with a projection 88 which is adapted to fit between the upper end of the bar 82 and a top piece 89 which is carried upon the horizontal portion 86 of the angle block and which is spaced from the upper end of the bar 81. The angle bar 81 of the opposite pair of packing members is similarly formed, as is also its companion bar 82 with the exception that the angle block thereof has its horizontal portion 90 of greater length than the portion 86 of the opposite block and the top piece 91 is of less length than the piece 89 to permit the horizontal portion 90 to overlap upon the opposite block 89. These pairs of bars are assembled in the opposite sides of a groove 78 and across the top thereof, and a filler bar or piece 92 is placed across the tops of the angle blocks to lie flush with the upper ends of the bars 82 and top piece 89 and 91. The springs 80 tend to expand the pairs of bars and thus seal the spaces about the opposite ends of the blade.

As shown in Figures 4, 5, and 11 the ports 47 of the rings 39 at one side of the abutment plate 51 communicates through the passages 49 with a channel 93 formed in the top of the casing, and which extends through the adjacent port rings 39 and the spacer ring 40. In a like manner, the ports 48 of the rings 39 at the opposite side of the baffle 51 are connected through their passages 50 with a section channel 94 which is formed in the upper face of the casing or housing and in the adjacent sections 39 and 40 thereof.

A valve casing 95 is fitted upon the upper end of the engine housing and is provided therein with a rotary valve 96. The valve 96 has a flange or head 97 upon one end and is held in the valve casing 95 by a plate or washer 98 fitting against its opposite end and held in place by a lock nut 99. The valve casing 95 is provided at longitudinally spaced apart points with passages 100 and 101 which respectively lead to the channels 93 and 94.

The passages 100 and 101 open into separate recesses or chambers 102 and 103 which are formed in the inner wall of the casing 95 and are adapted to partially extend about the rotary valve 96. The rotary valve 96 is provided with ports or recesses 104 and 105 which are arranged, upon the turning of the valve 96, to open at the desired intervals, with their chambers 102 and 103. The upper wall of the valve casing 95 is provided with openings 106 which register with the valve openings, and which also register with ports 107 and 108 in a valve cap or connecting casting 109 which is secured upon the upper side of the valve casing.

The inner ends of the valve casing 95 and the engine housing 38 are recessed or countersunk to provide a gear casing 110, as shown particularly in Figures 3 and 4. The valve 96 carries a gear wheel 111 which lies within the casing 110 and meshes with an idler gear wheel 112 mounted on a stud 113 within the casing 110, and which in turn meshes with a third gear wheel 114 mounted on the shaft 43. These gear wheels are enclosed within the casing 110 by a cover plate 115 which is secured by screws or the like as shown and which is suitably apertured to receive the head 97 of the valve and the shaft 43 therethrough.

In operation, an elastic fluid, such as steam, is admitted through the valve cap or casting 109 into one of the ports, such as the port 108. From port 108 the steam passes downwardly through the slot 106 to the rotary valve 96 and through the lateral recess or port 105 thereof through the bottom of the valve casing 95. As the steam leaves the rotary valve 96 it passes into the adjacent semicircular chamber 103 in the passage 101 and thence into the channel 94 in the top of the engine housing. This channel 94 distributes the steam to the various passages 50 and outlet ports 48 of the port rings 39 all at one side of the abutment 51. Steam entering the annular chamber or space in the engine housing expands, and at this time the abutment 51 is adjusted by its rocker arm 64 to bring a blade or section of the abutment 51 across the annular chamber and close the passage between the inlet port 48 and the outlet port 47.

The steam expanding against the closed abutment 51 exerts a counter pressure against the blade 72 for advancing the same in the annular chamber and turning the sleeve 44 and shaft 43. At the forward side of the blade or piston 72 the fluid is forced between the blade and the other side of the abutment 51, the fluid so confined being forced outwardly through the port 47, passage 49 and in the channel 93 from which the fluid passes into the semicircular chamber 102 of the valve casing 95, upwardly through the port 104 of the rotary valve 96 and finally into the upper slot 106 of the valve casing and exhaust port 107 of the valve cap. As the port rings 39 may be in any desired number the channel 94 feeds the steam to the various ports 48 of all of the port rings and in a like manner the channel 93 collects the exhaust fluid from the various chambers between the rings 39 by means of the ports 47 and the passages 49.

Of course the steam or other expansible fluid may travel in the opposite direction so that the opposite side of the abutment is utilized as the intake and the first side may be utilized as the exhaust. The cam 68 has its cam groove 69 so formed as to properly time the various intermittent sliding operations of the abutment 51 as to maintain the annular chamber divided as long as possible and until the blade 72 or rotary piston reaches a point adjacent to the baffle. At such point the baffle is quickly opened, and as soon as the blade passes the abutment the abutment is quickly closed.

The rotary valve 96 is so timed that during this opening and closing operation of the valve the rotary valve is maintained closed so that there will be no back pressure of the expansible fluid actions of the blade or piston 72. By constructing the various sections of the housing or casing of the motor as above described, any wear or breakage of the parts may be remedied quickly and economically, so as not to delay in any necessary repairs to the engine, a feature which is of utmost importance in the practical operation and maintenance of engines of any type and particularly with those which are used on railway rolling stock which are subjected to considerable vibration and rough usage.

It is obvious that various changes and modifications may be made in the details of construction and design of the above specifically described embodiment of this invention without departing from the spirit thereof, such changes and modifications being restricted only by the scope of the following claims.

What is claimed is:—

1. In a rotary engine, a housing comprising a plurality of interfitting and separable sections providing annular chambers and partitions between the chambers with ports in the partitions opening into the chambers, means for detachably securing said sections together, a rotary piston mounted in the housing and having a blade in each chamber, and an abutment arranged to slide transversely through said sections and having spaced portions one for each chamber adapted to enter the same or for cooperation with the respective blades and adapted to slide into said partitions for clearing the chambers and permit free movement of the blades therein.

2. In a rotary engine, a housing having a plurality of spaced apart annular chambers therein with partitions arranged between the chambers, a rotary piston in the housing having a blade for each chamber projecting into the same, an abutment slidably mounted in the housing and having a section for each chamber spaced apart at opposite sides of the partitions for movement into said chambers to cooperate with the blades, said abutment being longitudinally slidable for simultaneously moving said sections of the abutment out of said chambers and behind said partitions to permit passage of said blades in the chambers.

3. In a rotary engine, a housing comprising a plurality of ring sections clamped together, certain of said sections being hollow to provide annular chambers in the housing and intermediate ring sections comprising partitions arranged between the hollow sections, a piston mounted in the housing having blades thereon one for each annular chamber, packing carried by the blades for sealing the same individually in the chambers, and an abutment slidably mounted for longitudinal movement through all of said ring sections, and having a portion for each chamber, and operating means connected to the abutment for sliding the same in one direction for simultaneously closing the annular chambers and for sliding the abutment in the opposite direction for simultaneously disposing the portions of the abutment behind said partitions.

4. A rotary engine comprising a housing having opposite end sections and a plurality of intermediate rings clamped between the sections, alternate of said rings having intake and exhaust ports therein and intermediate rings having annular chambers therein adapted to communicate with the ports of the alternate rings, an abutment slidably mounted through the alternate rings between the ports thereof for dividing the intake ports from the exhaust ports, and operating means for the abutment for reciprocating the same longitudinally through the housing for opening said annular chambers at times.

5. In a rotary engine, a housing comprising a pair of end sections and a plurality of intermediate rings arranged between the end sections, alternate rings having intake and exhaust ports therein and intermediate rings having annular chambers therein communicating with said inlet and exhaust ports, said housing having in said rings channels connecting said ports into their respective inlet and exhaust groups, a rotary valve connected to the housing and having control means for said ports for simultaneously admitting an expansible fluid to all of the intake ports and for simultaneously exhausting all of the fluid from the exhaust ports, a piston mounted in the housing and having a blade for each annular chamber, an abutment slidably mounted in the housing through the rings thereof and having a section for each chamber for blocking off the same, connecting means between the piston and the abutment for actuating the latter at predetermined times to retract the abutment and permit the passage of the adjacent blade from the exhaust to the inlet side of the abutment, and operating means between the piston and the rotary valve for actuating the latter to control the intake and exhaust of the expansible fluid in timed relation to the operation of said abutment.

6. In a rotary engine, a housing having annular chambers therein, a piston mounted in the housing having a blade projecting radially into each chamber, an abutment slidably mounted in the housing having an abutment section for each chamber, a cam operated by the piston, a rocker arm connected to the abutment and to the cam for operation by the latter to retract the abutment from the chambers as the blades approach the abutment and to protect the abutment when the blade passes the plane thereof, a rotary valve for controlling admissions and exhaust of the expansible fluid to opposite sides of the abutment, and a connection between the piston and the rotary valve for actuating the latter in timed relation to the operation of the piston and the abutment.

7. In a rotary engine, a housing composed of a plurality of intermediate and end sections, a piston mounted in the housing and having a plurality of blades thereon, certain of said housing sections having separated intake and exhaust ports therein and other sections of the housing having annular chambers therein adapted to receive said blades, the sections of the housing having ports therein also provided with longitudinal slots arranged between the inlet and exhaust ports, an abutment fitted for longitudinal movement in said slots, a rocker arm forked at one end and pivoted thereat on the housing, a roller carried by the rocker arm in the bight of the fork, a cam on the piston projecting into the fork and engaging the roller for actuating the rocker arm, and a connection between the rocker arm and abutment for reciprocating the latter at predetermined intervals and to predetermined distances for retracting and protecting the abutment relatively to said chambers during the operation of said blades therein.

8. In a rotary engine, a housing composed of a plurality of sections clamped together, certain of said sections having annular chambers therein and other sections having intake and exhaust ports therein leading to said chambers, a rotary piston mounted in the housing and having blades projecting into said chambers, an abutment slidably mounted through the sections having a port for communication with the intake and exhaust ports, a piston mounted in the housing and having blades one for each chamber projecting radially thereinto, a cam on the piston, a rocker arm mounted on the housing and having a roller engaging said cam for swinging the rocker arm, and a connection between said abutment and the rocker arm for actuating the abutment in timed relation to the advancement of said blades, and means controlled by operation of the piston for admitting and exhausting an expansible fluid to said annular chambers.

9. In a rotary engine, a housing having spaced annular chambers therein and having a plurality of intake ports opening into said chambers and with a common channel communicating with said intake ports, said housing also having a plurality of exhaust ports spaced from the intake port and provided with a second common channel, a rotary valve communicating with the housing and having a port opening into the intake channel, and a second port opening into the exhaust channel, a piston in the housing having a blade for each chamber, an abutment projecting laterally into each chamber, an abutment slidably mounted in the housing with a portion for each chamber, a connection between the abutment and the piston for operating the baffle plate in timed relation to the advancement of the blades, and a second connection between the piston and the rotary valve for operating the latter in timed relation to the operations of the blades and the abutment.

10. In a rotary steam engine, a housing comprising a plurality of transverse sections, means for clamping said sections together, certain of said sections having annular chambers therein and other sections having intake and exhaust ports therein leading to the chambers, the end sections of said housing having recesses in their outer sides, an abutment slidably mounted in said sections, a rod connected to the abutment and projecting through one of said end sections, a rocker arm pivotally mounted in the recess of said end section and connected to said rod, a shaft journaled through said housing, a rotary piston on the shaft having blades extending into said chambers, a cam on said shaft in the recess of said end section and having connection with said rocker arm to actuate the same and move the abutment, a valve mounted on said housing, and intermeshing gear wheels carried by the valve and the housing and connected to said shaft, said gear wheels lying in the recess of the opposite end section.

11. In a rotary steam engine, a housing comprising a plurality of transverse sections, means for clamping said sections together, certain of said sections having annular chambers therein and intermediate sections having spaced apart intake and exhaust ports and provided with registering slots therethrough, an abutment slidably mounted in said slots and having sections adapted to be moved into and out of said chambers, a shaft journaled in the end sections of said housing, a piston mounted on the shaft and having blades extending into said chambers, the end sections of said housing having recesses in their outer sides, a cam on said shaft in one of said recesses, a rocker arm mounted on the end section in said recess, a roller on the rocker arm engaging the cam for actuating the rocker arm upon the turning of the cam, and a slidable connection between the rocker arm and the abutment for reciprocating the latter longitudinally upon the swinging of said rocker arm.

12. In a rotary steam engine, a housing comprising opposite end sections and a plurality of alternately arranged spacer and port sections clamped between the end sections, said spacer sections providing annular chambers therein and said port sections having spaced apart intake and exhaust ports opening into said chambers, an abutment slidably mounted in said port sections and having portions adapted to move transversely into and out of the chambers, a rod connected to said abutment and extending through one of the end sections, a shaft journaled into the end sections, a rotary piston mounted on the shaft within the housing and having radially extending blades projecting into said chambers, a cam on said shaft, a rocker arm mounted on an end section adjacent the cam, said cam having a peripheral groove therein, a roller carried by the rocker arm engaging in said groove for operating the rocker arm by the turning of the cam, a sliding connection between said rocker arm and said rod for reciprocating the abutment by the rocking of said arm, said end section having a cavity in its outer side for housing said cam and rocker arm, the opposite end section of the housing having a cavity in its outer side, a gear wheel mounted on the shaft in said last mentioned cavity, an idler gear wheel meshing with the first gear wheel and mounted in said cavity therewith, a rotary valve carried by the housing, and a third gear wheel on the rotary valve meshing with said second gear wheel for actuating the valve from the piston.

13. In a rotary steam engine, a housing comprising a plurality of sections, means for clamping the sections together, a piston mounted in the housing, a shaft fixed to the piston and journaled in the end sections of the housing, said housing having annular fluid chambers therein, blades carried by the piston projecting into said chambers, an abutment slidably mounted in the housing and having a section for each chamber adapted to traverse the same, means for operating the abutment, said housing having an inlet port for each chamber at one side of the abutment and having an exhaust port for each chamber at the other side of the abutment, a valve controlling admission and exhaust of the expansible fluid to and from said ports, and operating means for actuating the valve in timed relation to the operations of the piston and the abutment.

14. In a rotary steam engine, a housing comprising opposite end sections and a plurality of ring sections clamped between the end sections, certain of said ring sections having annular chambers therein and alternate ring sections having spaced apart intake and exhaust ports leading to said chambers, a piston fitting in the housing, a shaft journaled in the end sections of the housing for supporting the piston, an abutment slidably mounted in said alternate ring sections between the intake and exhaust ports and having sections adapted to traverse said annular chambers, a valve mounted on the housing for controlling said ports, operating means between the piston and the valve for operating the same in timed relation to the turning of the piston, and a second operating means between the abutment and the piston for operating the abutment in timed relation to the valve and to the piston.

15. In a rotary steam engine, a housing provided with annular steam chambers and partitions between the chambers with spaced apart intake and exhaust ports in said partitions leading to and from the chambers, an abutment slidably mounted in one side of the housing and having sections adapted to traverse said chambers and disposed between the intake and exhaust ports, a shaft journaled in the ends of the housing, a piston carried by the shaft and arranged within the housing and having blades for projecting into said chambers, packings carried by the blades for contact with the walls of the chambers to seal the blades therein, and operating means between the abutment and the shaft for moving the abutment in timed relation to the turning of the piston to permit continuous movement of said blades passed the plane of the abutment.

16. In a rotary steam engine, a housing provided with a central opening and having annular steam chambers thereabout and partitions between the chambers; said partitions having spaced apart intake and exhaust ports leading to the chambers, an abutment slidably mounted in the housing at one side of the central opening and having portions adapted to traverse the annular chambers, a shaft journaled in the housing, a rotary piston mounted on the shaft in said central opening of the housing, radiating blades carried by the piston projecting into said annular chambers, said blades having grooves in their opposite sides and ends, split packing bars interlocked and fitting in said grooves adapted to expand laterally to bind against the walls of the chambers for sealing the blades therein, and springs carried in said blades and bearing at opposite ends against the inner sides of said packing bars for normally spreading the same.

17. In a rotary steam engine, a housing having annular chambers therein and partitions between the chambers, said partitions having spaced apart intake and exhaust ports leading to and from the chambers, an abutment slidably mounted in the housing between said intake and exhaust ports, and pistons mounted in the housing, blades projecting from the piston into said chambers and having grooves therein extending throughout their exposed surfaces, interfitting split packing bars arranged in said grooves, and a plurality of springs carried in the blades and bearing at opposite ends against said packing bars for normally urging the same outward to spread the same and bind the bars against the walls of the chambers to seal the blades therein.

18. In a rotary steam engine, a housing having an axial opening and spaced annular chambers communicating with the opening, said housing having partitions between said chambers and intake and exhaust ports extending in spaced relation into said partitions and opening into the chambers, an abutment mounted in the housing, a shaft journaled in the housing, a rotary piston mounted on the shaft in the axial opening of the housing, connections between the abutment and the shaft for operating the abutment, a plurality of blades carried by the piston and projecting into said annular chambers, a rotary valve connected to the housing and arranged to control said intake and exhaust ports and an operative connection between the rotary valve and the shaft.

19. In a rotary engine, a housing having alternate annular chambers and partitions between the chambers, a shaft journaled in the housing, a piston mounted on the shaft having blades projecting into the annular chambers, an abutment slidably mounted in one side of the housing and having partitions adapted to traverse the annular chambers for interrupting the same at times, a connection between the shaft and said abutment for operating the latter in timed relation to the passage of said blades through the plane of the abutment, a valve connected to said housing, an intake port leading from said valve into the housing and having branches leading to said partitions at one side of the abutment and opening into one side of each chamber, an exhaust port leading from said valve into the housing and having branches leading through said partitions into the annular chambers at the other side of the abutment, and operating means between the valve and the shaft for controlling the intake and exhaust of the engine.

MATTHEW L. AKERS.